United States Patent [19]

Holub et al.

[11] Patent Number: 4,855,356

[45] Date of Patent: Aug. 8, 1989

[54] TERNARY POLYMER BLENDS CONTAINING A POLYETHERIMIDE, A POLYPHTHALATE CARBONATE, AND RUBBER MODIFIED VINYL AROMATIC POLYMER

[75] Inventors: Fred F. Holub, Schenectady, N.Y.; John A. Rock, Becket, Mass.

[73] Assignee: General Electric Company, Pittsfield, Mass.

[21] Appl. No.: 139,578

[22] Filed: Dec. 30, 1987

[51] Int. Cl.$^4$ .............................................. C08L 79/00
[52] U.S. Cl. ....................................... 525/66; 525/67; 525/92; 525/133; 525/146; 525/148
[58] Field of Search ................... 525/66, 67, 133, 146, 525/92, 148

[56] References Cited

U.S. PATENT DOCUMENTS

| | | | |
|---|---|---|---|
| 4,393,168 | 7/1983 | Giles, Jr. et al. | 525/66 |
| 4,430,484 | 2/1984 | Quinn | 524/425 |
| 4,629,729 | 12/1986 | Rock | 525/66 |
| 4,673,708 | 6/1987 | Rock et al. | 525/66 |

*Primary Examiner*—Theodore E. Pertilla
*Attorney, Agent, or Firm*—Bernard, Rothwell & Brown

[57] ABSTRACT

The present invention relates to ternary polymer blends containing (a) a polyetherimide, (b) a rubber modified vinyl aromatic polymer, and (c) a polyphthalate carbonate. The blends have excellent high temperature properties, improved impact resistance values and have excellent flexural values.

15 Claims, No Drawings

TERNARY POLYMER BLENDS CONTAINING A POLYETHERIMIDE, A POLYPHTHALATE CARBONATE, AND RUBBER MODIFIED VINYL AROMATIC POLYMER

BACKGROUND OF THE INVENTION

This invention is directed to molding compositions comprising ternary blends of a polyetherimide, a polyphthalate carbonate and rubber modified vinyl aromatic polymer.

Polyetherimides resins are well known in the art and are of considerable commercial value for use in molding compositions because of their excellent physical, chemical and thermal properties. The high glass transition and heat deflection temperatures exhibited by these polymers permit their use in high performance applications previously reserved for metals and some thermoset resins. While polyetherimides are known to possess a number of excellent properties, for many applications, it would be desirable to have a resin with improved flexural properties, yet which maintains the toughness and other advantageous physical properties of polyetherimides.

It is known that the flexural properties of polyetherimides can be improved by forming blends of those polymers with a rubber modified vinyl aromatic polymer. See, Giles et al., U.S. Pat. No. 4,393,168. Although such blends maintain many of the physical properties of polyetherimides, they have not been found to have the toughness or impact strengths characteristic of polyetherimides.

Binary blends of polyestercarbonate resins and polyetherimides have been prepared for the primary purpose of improving the thermal properties of the polyestercarbonates. See, pending U.S. patent application Ser. No. 073,319, filed July 13, 1987 and U.S. Pat. No. 4,430,484. Again, although these blends exhibit certain advantageous properties, they have not been found to possess the toughness or impact properties of polyetherimides.

Thus, there exists a need for a polymer blend which has good thermal properties and improved flexural properties over polyetherimides, yet maintains the toughness and impact properties of those polymers.

SUMMARY OF THE INVENTION

The present invention relates to a thermoplastic composition comprising, in admixture, (a) a polyetherimide, (b) a rubber modified vinyl aromatic polymer, and (c) a polyphthalate carbonate prepared from a dihydric phenol, a carbonate precursor, a terephthalic acid or ester derivative thereof, and an isophthalic acid or ester derivative thereof. The polyphthalate carbonate is further characterized by having from about 70 to about 95 weight percent ester content and a range of terephthalate groups ranging from about two to about fifteen percent of the ester content. These ternary compositions can be blended with other polymers such as polyesters, polycarbonates and polysulfones.

DETAILED DESCRIPTION OF THE INVENTION

The present invention provides ternary polymeric blends containing, in admixture, (a) a polyetherimide, (b) a rubber modified vinyl aromatic polymer, and (c) a polyphthalate carbonate.

The polyetherimides that can be employed in the present invention include repeating groups of the formula:

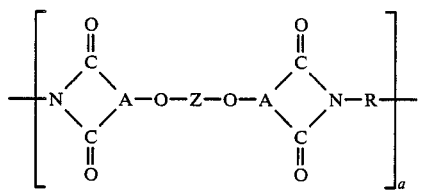

wherein "a" represents a whole number in excess of 1, e.g., 10 to 10,000 or more, the group —O—A< is selected from:

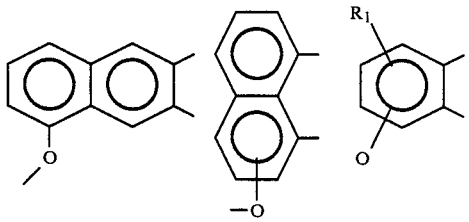

$R_1$ being hydrogen, lower alkyl or lower alkoxy. Preferably, the polyetherimide includes the latter —O—A< group where R' is hydrogen such that the polyetherimide is of the formula:

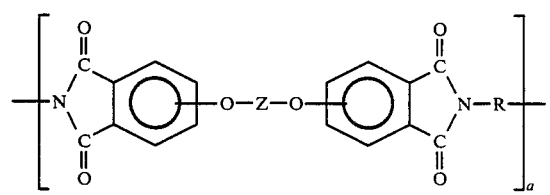

and the divalent bonds of the —O—Z—O— radical are in the 3,3', 3,4', 4,3' or the 4,4' position; Z is a member of the class consisting of (1)

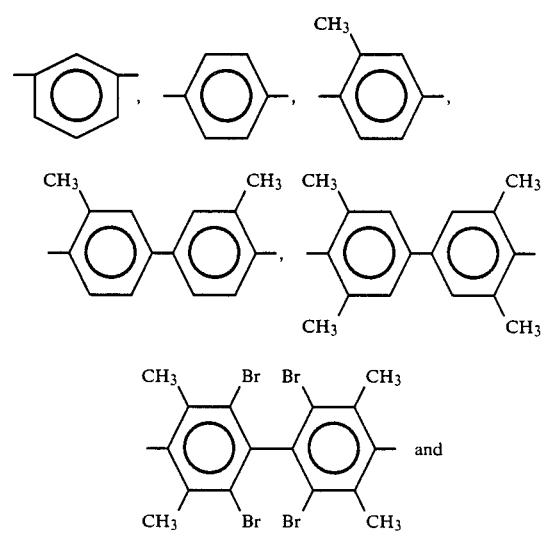

-continued

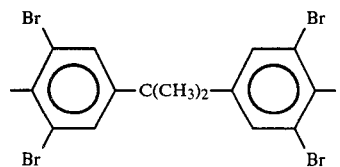

and (2) divalent organic radicals of the general formula:

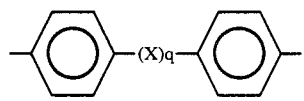

where X is a member selected from the class consisting of divalent radicals of the formulas,

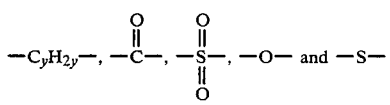

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, (3) $C_2$ to about $C_8$ alkylene terminated polydiorganosiloxane, and (4) divalent radicals included by the formula:

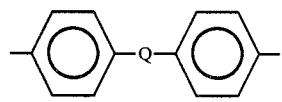

where Q is a member selected from the class consisting of:

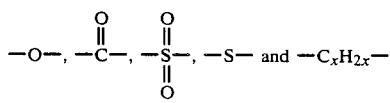

where x is a whole number from 1 to 5 inclusive. Particularly preferred polyetherimides for the purposes of the present invention include those wherein —O—A< and Z respectively are:

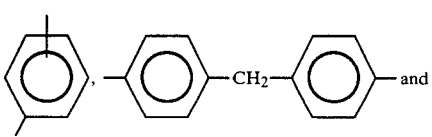

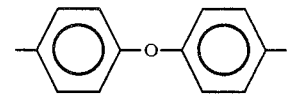

The polyetherimides wherein R is m-phenylene are most preferred.

In one embodiment of the present invention the polyetherimide may be a copolymer which, in addition to the etherimide units described above, further contains repeating units of the formula:

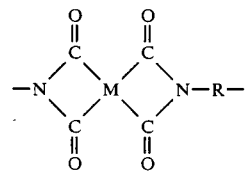

where R is previously defined and M is selected from the group consisting of:

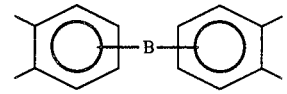

where B is —S— or

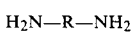

These polyetherimide copolymers are described by Williams, et al., U.S. Pat. No. 3,983,093, incorporated herein by reference.

The polyetherimides can be obtained by any of the methods well known to those skilled in the art, including the reaction of an aromatic bis(ether anhydride) of the formula:

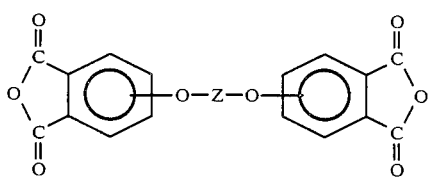

with an organic diamine of the formula:

$H_2N—R—NH_2$ where Z and R are as defined hereinbefore.

Aromatic bis(ether anhydride)s of the above formula include, for example, 2,2-bis[4-(2,3-dicarboxyphenoxy)-phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S.; bessonov, M. I.; Rudakov, A. P. (Institute of Heteroorganic Compounds, Academy of Science, U.S.S.R.), U.S.S.R. 257,010, Nov. 11, 1969, Appl. May 3, 1967. In addition, dianhydrides are shown by M. M. Koton, F. S. Florinski, *Zh. Org. Khin.*, 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis( -amino-t-butyl)toluene, bis(p-β-methyl-o-aminopentyl)benzene, 1,3-diamino-4-isopropylbenzene, 1,2-bis(3-aminopropoxy)-ethane, m-xyxlylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, and the like.

Advantageously, the reactions between the dianhydrides and the diamines can be carried out employing well known solvents, e.g., o-dichlorobenzene, m-cresol/toluene, etc. at temperatures of from about 100° C. to about 250° C. Alternatively, the polyetherimides can be prepared by melt polymerization of any of the above dianhydrides with any of the above diamine compounds while heating the mixture of ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides; however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

In addition to the polyetherimide, the compositions of the present invention contain a polyphthalate carbonate. The polyphthalate carbonates useful in the present invention are derived from a dihydric phenol, a carbonate precursor, a terephthalic acid or acid derivative and an isophthalic acid or acid derivative. The polyphthalate carbonate has from about 70 to about 95 weight percent ester content and a range of terephthalate groups from about 2 to about 15 weight percent of the total ester content. These polyphthalate carbonates are known and are described, for example, by Miller et al., U.S. Pat. No. 4,465,820, herein incorporated by reference.

The dihydric phenols which can be employed to prepare the polyphthalate carbonates useful in this invention include the dihydric phenols generally found useful in preparing aromatic polycarbonates. Typical dihydric phenols which can be employed are: 2,2-bis(4-hydroxyphenyl)propane(bisphenol A); 2,4'-dihydroxydiphenylmethane; bis(2-hydroxyphenyl)methane; bis(4-hydroxyphenyl)methane; bis(4-hydroxy-5-propylphenyl)methane; bis(4-hydroxy-2,6-dimethyl-3-methoxyphenyl)methane; 1,1-bis(4-hydroxyphenyl)ethane; 1,1-bis(4-hydroxy-2-ethylphenyl)ethane; 2,2-bis(3-phenyl-4-hydroxyphenyl)propane; bis(4-hydroxyphenyl)cyclohexylmethane; and 2,2-bis(4-hydroxyphenyl)-1-phenylpropane.

Bisphenols other than those having a carbon atom between the two phenols can also be employed. Examples of such groups of bisphenols include bis(hydroxyphenyl)sulfides, bis(hydroxyphenyl)ethers and bis(hydroxyphenyl)sulfoxides and the like.

Preferred dihydric phenols are those of the formula

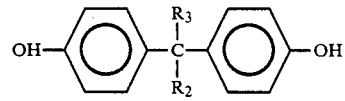

wherein $R_2$ and $R_3$ are the same or different and are hydrogen or alkyl of from one to six carbon atoms, inclusive. The most preferred dihydric phenol is bisphenol A.

The aromatic dicarboxylic acids employed in the preparation of the polyphthalate carbonate are terephthalic acid and isophthalic acid and reactive derivatives thereof. Any derivative of a carboxylic acid which is reactive with the hydroxyl of a dihydric phenol can be employed. The acid halides are generally employed because of their ease of reactivity and availability. The acid chlorides are preferred.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, a di(halophenyl)carbonate such as di(chlorophenyl)carbonate, di(bromophenyl)carbonate, di(trichlorophenyl)carbonate, di(tribromophenyl)-carbonate, etc., di(alkylphenyl)carbonate, such as di(tolyl)carbonate, etc., di(chloronaphthyl carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The weight percent ester content in the polyphthalate carbonate is from about 70 to about 95, preferably 75 to 90. Above about 95 weight percent ester content, the polyphthalate carbonate is generally more difficult to process. Below about 70 weight percent ester content, the distortion temperatures under load of the polymer are generally less than desirable. The weight percent ester content is calculated in the manner as described in U.S. Pat. No. 4,465,820.

The quantity of terephthalate units present in the polyphthalate carbonate can range from about 2 to about 15 weight percent, with the remaining ester units being isophthalate units. When the terephthalate units are below 2 weight percent, the Notched Izod impact resistance of the polyphthalate carbonate is undesirably low. Above 15 weight percent terephthalate, the resistance of the polymer to stress cracking is lowered. Preferably, the amount of terephthalate units ranges from about 5 to about 10 weight percent.

In addition to the polyetherimide component and polyphthalate component, the present invention contains a rubber modified vinyl aromatic polymer. The rubber modified vinyl aromatic polymers of the blends of the invention contain homopolymers and/or copolymers derived from a vinyl aromatic monomer of the structural formula

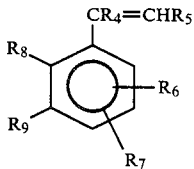

where $R_4$ and $R_5$ are selected from the group consisting of hydrogen and lower alkyl or lower alkenyl groups of from 1 to 6 carbon atoms; $R_6$ and $R_7$ are selected from the group consisting of hydrogen, halogen such as chlorine or bromine, and lower alkyl of 1 to 6 carbon atoms; $R_8$ and $R_9$ are selected from the groups consisting of hydrogen and lower alkyl and alkenyl groups of 1 to 6 carbon atoms or $R_8$ and $R_9$ may form an unsaturated hydrocarbyl ring structure.

Generally, the rubber modified vinyl aromatic polymers are derived from at least 25%, preferably at least about 50%, of the above vinyl aromatic monomers. Vinyl aromatic monomers of the above formula include styrene, α-methylstyrene, t-butylstyrene, vinyl toluene, vinyl xylene, ethyl vinyl benzene, chlorostyrene, ethyl vinyl toluene, isopropenyl toluene and diethyl vinyl benzene. A preferred vinyl aromatic monomer is styrene.

Other monomers which can be copolymerized with the above vinyl aromatic monomers include those of the general formula:

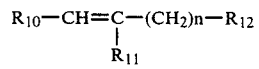

wherein $R_{10}$ and $R_{11}$ are selected from the group consisting of hydrogen, halogen, alkyl groups of 1 to 4 carbon atoms, carboalkoxy or $R_{10}$ and $R_{11}$ taken together represent an anhydride linkage (—COOOC—) and $R_{12}$ is selected from hydrogen, vinyl, alkyl or alkenyl groups having from 1 to 12 carbon atoms, cycloalkyl, carboalkoxy, alkoxy-alkyl, alkyl carboxy, ketoxy, halogen, carboxy, cyano or pyridyl and n is 0 or an integer from 1 to 9. Copolymerizable monomers of the above formula include acrylonitrile, methacrylonitrile, acrylic acid, methacrylic acid, maleic anhydride, vinyl chloride, vinylidene chloride, methyl methacrylate, ethyl acrylate, acrylamide, butadiene, isoprene and the like.

The above vinyl aromatic homopolymers or copolymers are modified by the incorporation of a rubber or elastomeric material. Such an incorporation can be accomplished by blending or graft or block copolymerization with the homopolymer or copolymer derived from the vinyl aromatic monomer. Suitable rubbers include polymers of aliphatic conjugated dienes such as 1,3-butadiene, isoprene, methylisoprene as well as ethylene propylene copolymers and EPDM rubber.

Preferred rubber modified vinyl aromatic polymers for the purposes of the present invention include the various grades of methylmethacrylate-butadiene-styrene (MBS), styrene-ethylene-butylene-styrene (SEBS), acrylonitrile-butadiene-styrene (ABS) and high impact polystyrene (HIPS) which is polystyrene containing from about 3 to 10% by weight of polybutadiene or a styrene-butadiene copolymer.

The rubber modified vinyl aromatic polymers used in the blends of this invention can be prepared by any of the techniques well known in the art. For example, a method of preparing acrylonitrile-butadiene-styrene or acrylonitrile-butadiene-methylstyrene type polymers comprises grafting 73 parts styrene and 42 parts acrylonitrile onto polybutadiene latex containing 58 parts polybutadiene in the presence of 3 parts soap, 1.7 parts mercaptan and 0.4 parts potassium peroxydisulfate at 50° C. The latex is coagulated and the product is then milled for 10 minutes at 320° F. Other useful methods for preparing these polymers may be found in U.S. Pat. No. 2,505,349, U.S. Pat. No. 2,550,139; U.S. Pat. No. 2,698,313; U.K. Pat. No. 698,385; U.S. Pat. No. 2,713,566; U.S. Pat. No. 2,820,773; and U.S. Pat. No. 2,908,661, all of which are hereby incorporated by reference. In addition, a great number of these polymers are available commercially.

The polyetherimides, polyphthalate carbonates and rubber modified vinyl aromatic polymers are combinable with each other in a wide variety of proportions. Accordingly, compositions comprising from 1 to 98 percent by weight of a polyetherimide, from 1 to 98 percent by weight of a polyphthalate carbonate, and 1 to 98 percent by weight of rubber modified vinyl aromatic polymer are included within the scope of the present invention. Preferably, the ternary blend comprises from about 1 to about 96 percent by weight of polyetherimide, from about 1 to about 96 percent by weight of polyphthalate carbonate, and 3 to 20 percent by weight of rubber modified vinyl aromatic polymer.

A particularly preferred ternary blend comprises from about 1 to 96 percent by weight polyetherimide, from about 1 to 96 percent by weight of polyphthalate carbonate, and from about 8 to 15 percent by weight of rubber modified vinyl aromatic polymer. By controlling the proportions of each component, blends can be formed having improved properties over those of either a polyetherimide alone, a polyphthalate carbonate alone, a rubber modified aromatic polymer alone or combination of any two of the foregoing. Generally, with increasing levels of polyetherimide, the higher the flexural strength, flexural modulus, flexural retardancy and heat distortion temperature will be of the resulting blend. With increasing levels of polyphthalate carbonate, the higher the IZOD impact value of the blends will be. With increasing levels of rubber modified vinyl aromatic polymer, the lower the flexural values will be.

Methods for forming the polyetherimide/polyphthalate carbonate/rubber modified vinyl aromatic polymer blends of the present invention may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conveniently used to mold normally solid thermoplastic compositions.

If desired, the ternary blends of the present invention can be modified by adding amounts of another polymer or polymers. Examples of such polymers include, polyesters, polycarbonates and polysulfones.

The following examples are set forth to further illustrate the present invention and are not to be construed as limiting the invention.

EXAMPLES 1–4

A series of ternary blends containing a polyetherimide, a polyphthalate carbonate (PPC) and high impact styrene (HIPS) was prepared according to the present invention. The polymer blends were melt blended, the blend was molded into test specimens, and the specimens were tested for their physical properties. The polyetherimide that was used is commercially available from the General Electric Company under the trademark Ultem®1000. The polyphthalate carbonate that was used is commercially available from the General Electric Company and is identified as Lexan®PPC-4701. The high impact styrene (HIPS) that was used was purchased from Foster Grant under the designation GF-840.

The test results and the respective concentration of each component are shown in the table below.

TABLE I

| Example | 1 | 2 | 3 | 4 |
|---|---|---|---|---|
| Polyetherimide | 12.5 | 12.5 | 34.0 | 75.0 |
| PPC | 12.5 | 75.0 | 33.0 | 12.5 |
| HIPS | 75.0 | 12.5 | 33.0 | 12.5 |
| Extruded °C. | 266 | 282 | 282 | 293 |
| Molded °C. | 293 | 293 | 293 | 293 |
| IZOD Impact[1] Notched ⅛" bar | 0.20 | 4.1 | 0.6 | 1.3 |
| IZOD Impact[1] Rev Notched ⅛" bar (ft lbs/in) | 0.6 | 15 | 2.1 | 3.2 |
| Flexural modulus[2] (psi) | 341,500 | 328,900 | 366,500 | 423,000 |
| Flexural Strength[2] (psi) | 4,316 | 13,480 | 10,700 | 16,150 |
| Heat Distortion Temperature[3] °C. | | | | |

TABLE I-continued

| Example | 1 | 2 | 3 | 4 |
|---|---|---|---|---|
| 264 psi | 82.1 | 150.8 | 128.8 | 177.6 |

[1]Tested according to ASTM method D-256
[2]Tested according to ASTM method D-790
[3]Tested according to ASTM method D-648

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to workloading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrapings (form wound coil insulation for motors), for containers and container linings, in laminating structures where films of the present composition or where solutions of the claimed compositions of matter are applied to various heat-resistant or other type of materials such as asbestos, mica, glass fiber and the like and superimposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinyl formal resins, epoxy resins, polyimides, polytetrafluoro-ethylene, etc. The use of the curable compositions of the present invention as overcoats on other types of insulation is not precluded.

In addition, molding compositions and molded articles may be formed from the polymeric compositions in this invention by incorporating such fillers as asbestos, glass fibers, talc, quartz powder, wood flour, finely divided carbon, and silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

Other modification and variations of the present invention are possible in light of the above teachings. It is, therefore, to be understood that changes may be made in the particular embodiments of the invention described which are within the full intended scope of the invention as defined by the appended claims.

What is claimed is:

1. A ternary polymer blend comprising in admixture (a) a polyetherimide, (b) a rubber modified vinyl aromatic polymer, and (c) a polyphthalate carbonate prepared from a dihydric phenol, a carbonate precursor, a terephthalic acid or ester-forming derivative thereof, an isophthalic acid or ester-forming derivative thereof, said polyphthalate carbonate having from about 70 to 95 weight percent ester content and a range of terephthalate groups ranging from about 2 to about 15 percent of the ester content, wherein the rubber modified vinyl aromatic polymer is selected from the group consisting of methyl methacrylate-butadiene-styrene, styrene-ethylene-butylene-styrene, acrylonitrile-butadiene-styrene and high impact polystyrene.

2. The ternary blend of claim 1 wherein said polyetherimide includes repeating groups of the formula:

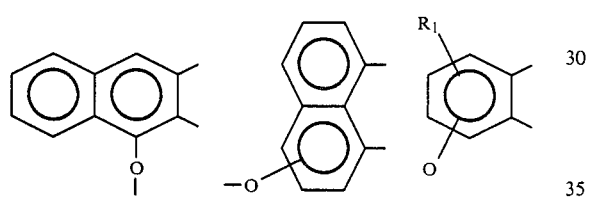

where a represents a whole number in excess of 1, the group —O—A< is selected from:

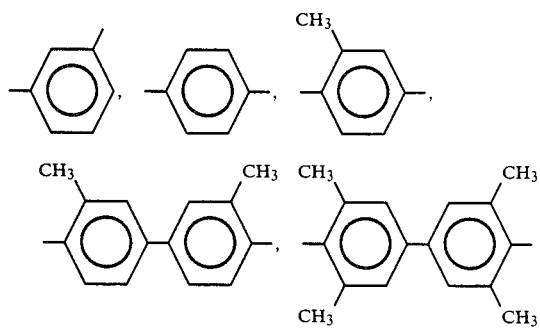

$R_1$ being hydrogen, lower alkyl or lower alkoxy, Z is a member of the class consisting of (1):

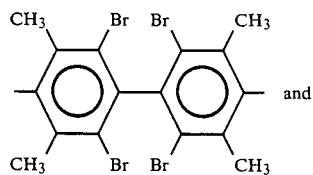

and (2) divalent organic radicals of the general formula:

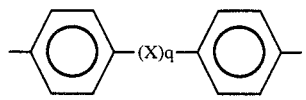

where X is a member selected from the class consisting of divalent radicals of the formulas:

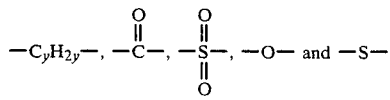

where q is 0 or 1, y is a whole number from 1 to 5, and R is a divalent organic radical selected from the class consisting of (1) aromatic hydrocarbon radicals having from 6 to about 10 carbon atoms and halogenated derivatives thereof, (2) alkylene radicals and cycloalkylene radicals having from 2 to about 20 carbon atoms, (3) $C_2$ to about $C_8$ alkylene terminated polydiorganosiloxane, and (4) divalent radicals included by the formula:

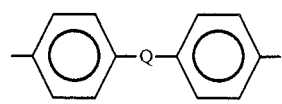

where Q is a member selected from the class consisting of:

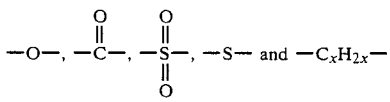

where x is a whole number from 1 to 5 inclusive.

3. The ternary blend of claim 2 wherein the polyetherimide is of the formula:

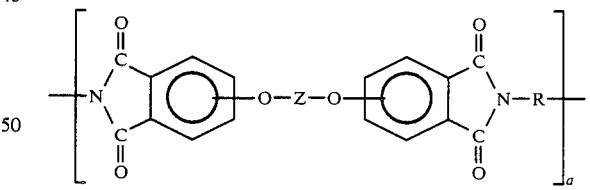

4. The ternary blend of claim 3 wherein Z is:

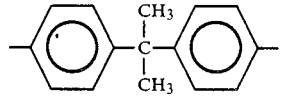

and R is selected from;

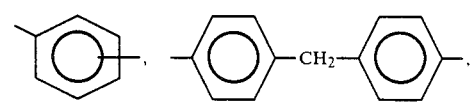

-continued

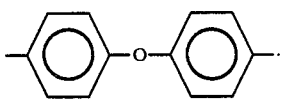

5. The ternary blend of claim 4 wherein the polyetherimide is of the formula:

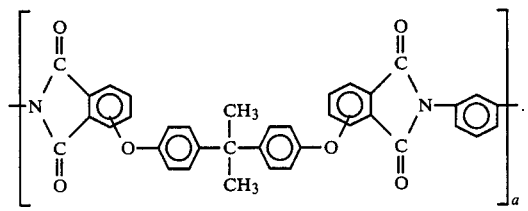

6. The ternary blend of claim 4, wherein the polyetherimide further includes repeating units of the formula

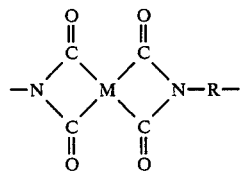

where R is previously defined and M is selected from the group consisting of

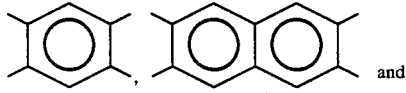  and

-continued

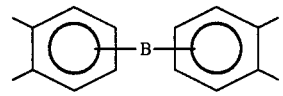

where B is —S— or

7. The ternary blend of claim 1 wherein the weight percent ester content is from about 75 to 90.

8. The ternary blend of claim 1 wherein the range of terephthalate groups range from about five to about 10 percent of the ester content.

9. The ternary blend of claim 1 wherein the dihydric phenol is bisphenol A.

10. The ternary blend of claim 1 wherein the rubber modified vinyl aromatic polymer is high impact polystyrene.

11. The ternary blend of claim 1 wherein the rubber modified vinyl aromatic polymer is methyl-methacrylate-butadiene-styrene.

12. The ternary blend of claim 1 wherein the rubber modified vinyl aromatic compound is styrene-ethylene-butylene-styrene.

13. The ternary blend of claim 1 wherein from about 1 to about 98 percent by weight is said polyetherimide, from about 1 to about 98 percent by weight is said rubber modified vinyl aromatic polymer and from about 1 to about 98 percent by weight is said polyphthalate carbonate.

14. The ternary blend of claim 13 wherein from about 1 to about 96 percent by weight is said polyetherimide, from about 3 to 20 percent by weight is said rubber modified vinyl aromatic polymer and from about 1 to 96 percent by weight is said polyphthalate carbonate.

15. The ternary blend of claim 14 wherein said rubber modified vinyl aromatic polymer is high impact polystyrene.

* * * * *